UNITED STATES PATENT OFFICE.

ERNST PREISWERK AND ERNST GRETHER, OF BASEL, SWITZERLAND, ASSIGNORS TO SOCIETY OF CHEMICAL INDUSTRY IN BASLE, OF BASEL, SWITZERLAND.

ALLYL DERIVATIVE OF BARBITURIC ACID AND PROCESS OF MAKING SAME.

1,042,265.     Specification of Letters Patent.     Patented Oct. 22, 1912.

No Drawing.     Application filed May 21, 1912. Serial No. 698,814.

*To all whom it may concern:*

Be it known that we, ERNST PREISWERK, a citizen of the Swiss Republic, and ERNST GRETHER, a subject of the Grand Duke of Baden, both chemists, and residents of Basel, Switzerland, have invented a new Allyl Derivative of Barbituric Acid and a Process of Making Same, of which the following is a full, clear, and exact specification.

It is known that the dimethylbarbituric acid and the diethylbarbituric acid have been prepared firstly by Conrad and Guthzeit (*Comp. Berichte* XIV, 1881, page 1643 and *Berichte* XV, 1882, page 2849) by acting with methyliodid or ethyliodid on the silver salt of the barbituric acid. This method gives however small yields and till now nobody succeeded in the production of alkylbarbituric acid in a technically satisfactory manner by direct alkylation of barbituric acid.

We have now made the suprising observation that the hitherto unknown allyl derivatives of barbituric acid can be prepared with a technically satisfactory yield by reacting directly on barbituric acid with an allylhalid as for instance allylbromid. By the introduction of the "allyl" group in the molecule of the barbituric acid the hypnotic action is considerably increased, so that for instance the hypnotic action of the diallylbarbituric acid is a multiple of the hypnotic action of the diethylbarbituric acid (veronal).

Example: Into a solution of 25.6 parts of barbituric acid in 200 parts of water and 100 parts of alcohol, which is boiled in a vessel provided with a reflux condenser, is slowly instilled a solution of 48.2 parts of allylbromid and of 54.4 parts of crystallized sodium acetate in 250 parts of alcohol and 100 parts of water. The mixture is further boiled for some time in the same vessel provided with reflux condenser and the alcohol is distilled off by introduction of steam. By cooling the remaining solution the diallylbarbituric acid crystallizes out in the form of reddish crystals which are separated by filtration, washed with some cold water and purified by recrystallization from boiling water. The pure diallylbarbituric acid constitutes colorless leaflets melting at 169 to 170° C.

The diallylbarbituric acid corresponds to the formula

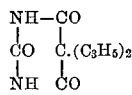

If in the foregoing example the indicated quantity of allylbromid is reduced to the half, the monoallylbarbituric acid is obtained, which melts at 172° C., dissolves considerably more easily in water than the diallyl derivative and can be transformed into the diallylbarbituric acid by further treatment with allylbromid.

What we claim is:

1. The described process for the manufacture of allyl derivatives of barbituric acid consisting in treating the barbituric acid with an allylhalid.

2. The described process for the manufacture of diallylbarbituric acid, consisting in treating barbituric acid with allylbromid.

3. As new product, the described diallylbarbituric acid having excellent hypnotic properties and constituting colorless leaflets, melting at 169 to 170° C., difficultly soluble in cold water, but easily soluble in hot water.

In witness whereof we have hereunto signed our names this 9th day of May 1912, in the presence of two subscribing witnesses.

ERNST PREISWERK.
    ERNST GRETHER.

Witnesses:
    GEO. GIFFORD,
    AMAND RITTER.